United States Patent [19]

Mizuno et al.

[11] Patent Number: 5,300,244

[45] Date of Patent: Apr. 5, 1994

[54] METHOD OF PREPARING MAGNETIC COATING COMPOSITION

[75] Inventors: Chiaki Mizuno; Masatoshi Kiyama; Takao Komi; Hiroshi Ogawa; Masaaki Fujiyama; Shinichi Funabashi, all of Kanagawa, Japan

[73] Assignee: Fuji Photo Film Co., Ltd., Minami, Japan

[21] Appl. No.: 952,197

[22] Filed: Sep. 28, 1992

Related U.S. Application Data

[63] Continuation of Ser. No. 247,014, Sep. 21, 1988, abandoned.

[30] Foreign Application Priority Data

Sep. 21, 1987 [JP] Japan .................. 62-236872

[51] Int. Cl.$^5$ .................. H01F 1/00
[52] U.S. Cl. .................. 252/62.54; 425/204; 425/205
[58] Field of Search .......... 252/62.54; 366/292, 366/297, 279, 315; 425/204, 205; 264/349

[56] References Cited

U.S. PATENT DOCUMENTS

| | | | |
|---|---|---|---|
| 4,154,895 | 8/1979 | Ogawa et al. | 252/62.54 |
| 4,619,777 | 10/1986 | Melzer et al. | 252/62.54 |
| 4,634,632 | 1/1987 | Ogawa et al. | 252/62.54 |
| 4,668,568 | 5/1987 | Fujiyama et al. | 252/62.54 |

FOREIGN PATENT DOCUMENTS 62-41274  3/1987  Japan .

Primary Examiner—Wayne Langel
Assistant Examiner—Stephen G. Kalinchak
Attorney, Agent, or Firm—Sughrue, Mion, Zinn, Macpeak & Seas

[57] ABSTRACT

A method of preparing a magnetic coating composition comprises a first process for kneading ferromagnetic grains, a binder and a binder solution Y1 by use of a two-shaft continuous kneading and mixing machine to obtain a kneaded mixture K1 having a solid content within the range of 65 wt % to 95 wt %, a second process for kneading a binder solution Y2 and the kneaded mixture K1 by use of the two-shaft continuous kneading and mixing machine to obtain a primary diluted mixture K2 having a solid content within the range of 50 wt % to 70 wt %, a third process for diluting and dispersing the primary diluted mixture K2 in an organic solvent to obtain a secondary diluted mixture K3 having a solid content within the range of 25 wt % to 50 wt %, and a fourth process for finely dispersing the secondary diluted mixture K3 to obtain a dispersion mixture K4 having a solid content within the range of 25 wt % to 45 wt %.

10 Claims, 4 Drawing Sheets

DISPERSION MIXTURE DISCHARGED

METHOD OF PREPARING MAGNETIC COATING COMPOSITION

This is a Continuation of Application No. 07/247,014 filed Sep. 21, 1988 now abandoned.

BACKGROUND OF THE INVENTION

1. Field of the Invention

This invention relates to a method of preparing a magnetic coating composition for a magnetic recording medium. This invention particularly relates to a method of preparing a magnetic coating composition by use of at least a two-shaft continuous kneading and mixing machine.

2. Description of the Prior Art

In the production of a magnetic recording medium, in order to quickly obtain a magnetic coating composition having a high dispersing quality, there has heretofore been known to carry out a series of processes for kneading ferromagnetic grains and a small amount of a binder solution by use of an incorporating machine such as a kneader exhibiting high shearing force before the ferromagnetic grains are dispersed in the binder solution by use of a dispersing machine such as a ball mill or a sand grinder. Also, in order to obtain a uniform paste by the kneading, it has heretofore been known to increase the kneading effect by use of a dispersant and/or a stabilizer or by use of a binder within a specified range of concentration. The techniques with respect to these preparation methods are disclosed in, for example, Japanese Unexamined Patent Publication Nos. 46(1971)-3030, 48(1973)-104505, 49(1974)-14537, 53(1978)-76012, 55(1980)-25406, and 57(1982)-141026.

As for the preparation apparatus for carrying out the kneading and dispersion and the operating conditions of the apparatus in the preparation of the magnetic coating composition, it has heretofore been known to improve the dispersing quality by operating a kneader under specific shearing force or operating a dispersing machine or members in the dispersing machine under specific conditions.

In general, with the conventional methods of preparing a magnetic coating composition, ferromagnetic grains are kneaded together with a binder and an organic solvent, and the kneaded mixture thus obtained is diluted with a solution of a binder in an organic solvent, thereby to form the coating composition. However, with the medium dispersing machine such as a sand grinder or a ball mill used conventionally, dispersion cannot be achieved substantially. Therefore, with the conventional methods wherein the coating composition is prepared by carrying out the kneading and then the dispersion, the ferromagnetic grains cannot be substantially dispersed in a fine-grain form in the coating composition, and a re-dispersing process must be carried out after the dispersion. Accordingly, a long time has heretofore been taken for dispersion processing.

Also, with the conventionally used, batch type kneading machine such as a kneader or a roll mill, it is difficult to continuously achieve material feed, kneading and discharging. Furthermore, as the operating conditions of the kneading machine are defined in terms of the rotation speed and torque, it is difficult to control the quality of the kneaded mixture, and the quality fluctuates largely.

In order to eliminate the aforesaid problems, a novel method has been proposed in Japanese Unexamined Patent Publication No. 62(1987)-41274. The proposed method comprises the steps of, in the preparation of a magnetic coating composition, utilizing a continuous kneading and mixing machine for the kneading of materials such as ferromagnetic grains and a binder, and diluting the thus obtained kneaded mixture by use of a high-speed dispersion stirrer (flow jet mixer). However, it was found that the viscosity of the kneaded mixture obtained by the kneading with the continuous kneading and mixing machine often increases up to a value within the range of several millions of poises to several tens of millions of poises, and such a high-viscosity kneaded mixture cannot readily be diluted under high shearing force even though the dilution and dispersion are carried out in the manner as mentioned above. Therefore, small lumps of the high-viscosity kneaded mixture readily remain in the diluted mixture, and a uniform diluted mixture cannot readily be obtained.

As mentioned above, in the case where the continuous wet-type medium dispersing machine is used for further finely dispersing the diluted mixture, the dispersion processing time becomes long, and the degree of dispersion is not sufficiently high. Therefore, a magnetic recording medium made by use of the magnetic coating composition obtained in this manner cannot exhibit substantially high electromagnetic conversion characteristics.

SUMMARY OF THE INVENTION

The primary object of the present invention is to provide a method of preparing a magnetic coating composition, which enables efficient dilution and dispersion of a kneaded mixture obtained by the kneading under high shearing force using a two-shaft continuous kneading and mixing machine so that no agglomerate is given rise to in the kneaded mixture.

Another object of the present invention is to provide a method of preparing a magnetic coating composition, wherein processes for feed of materials such as ferromagnetic grains and a binder for the magnetic coating composition, kneading, dilution and dispersion are carried out continuously.

The specific object of the present invention is to provide a method of preparing a magnetic coating composition, which is suitable for production of a magnetic recording medium exhibiting high electromagnetic conversion characteristics.

The present invention provides a method of preparing a magnetic coating composition, wherein the magnetic coating composition is prepared from a dispersion mixture K4 obtained by:

i) a first process for kneading ferromagnetic grains, a binder, and a binder solution Y1 containing a binder and an organic solvent under high shearing force by use of a two-shaft continuous kneading and mixing machine, thereby to obtain a kneaded mixture K1 having a solid content within the range of 65 wt % to 95 wt %, ii) a second process for adding at least a binder solution Y2, which may be identical with or different from said binder solution Y1, to said kneaded mixture K1, and kneading the thus obtained mixture and thus diluting said kneaded mixture K1 under high shearing force by use of said two-shaft continuous kneading and mixing machine, thereby to obtain a primary diluted mixture K2 having a solid content within the range of 50 wt % to 70 wt %, iii) a third process for diluting and dispersing said primary diluted mixture K2 by adding at least an organic solvent thereto, thereby to obtain a secondary diluted mixture K3 having a solid content within the range of 25 wt % to 50 wt %, and iv) a fourth process for carrying out fine dispersion processing of said secondary diluted mixture K3 directly or by the addition of an organic solvent thereto, thereby to obtain said dispersion mixture K4 having a solid content within the range of 25 wt % to 45 wt %.

The method of preparing a magnetic coating composition in accordance with the present invention basically comprises the four specific processes. In each process, the kneading or dispersion is carried out in an optimal solid content concentration by use of an optimal kneading machine or an optimal dispersing machine. In this manner, the preparation time for the magnetic coating composition can be shortened markedly, and a magnetic coating composition exhibiting a high degree of dispersion can be obtained.

Specifically, with the first process wherein the mixture having a very high viscosity for the preparation of the magnetic coating composition is kneaded under high shearing force by use of the two-shaft continuous kneading and mixing machine, a kneaded mixture exhibiting a very high degree of dispersion can be obtained quickly. With the second process wherein the kneaded mixture having a very high viscosity obtained by the first process is diluted and dispersed under high shearing force by use of the same two-shaft continuous kneading and mixing machine as in the first process, the viscosity of the high-viscosity kneaded mixture can be decreased efficiently. Also, with the third and fourth processes, the dispersion and the fine dispersion can be carried out very quickly.

Also, with the method of preparing a magnetic coating composition comprising the four specific processes in accordance with the present invention, the processes for the feed of materials such as ferromagnetic grains and a binder for the magnetic coating composition, the kneading, the dilution and the dispersion can be carried out continuously.

Furthermore, a magnetic recording medium made by applying the magnetic coating composition obtained by the method in accordance with the present invention onto a substrate has high surface gloss and excellent electromagnetic conversion characteristics by virtue of a high dispersing quality of the ferromagnetic grains and the like.

DETAILED DESCRIPTION OF THE INVENTION

Figure 1:
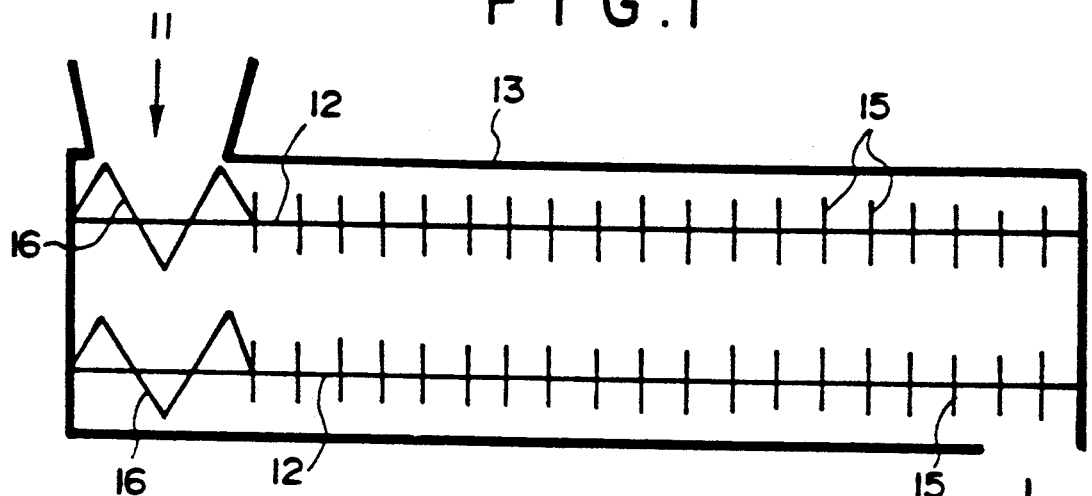
FIG. 1 is a schematic view showing the two-shaft continuous kneading and mixing machine for kneading the mixture for the preparation of the magnetic coating composition.

Basically, the method of preparing a magnetic coating composition in accordance with the present invention comprises the first process for the kneading by use of the two-shaft continuous kneading and mixing machine, the second process for the kneading and dilution by use of the two-shaft continuous kneading and mixing machine, the third process for the dilution and dispersion, and the fourth process for the fine dispersion. In the respective processes, the mixture for the preparation of the magnetic coating composition is processed in the optimal solid content concentration by use of an optimal kneading machine or an optimal dispersing machine. In this manner, the solid content can be gradually decreased from process to process, and a uniform dispersion mixture can be obtained ultimately.

First, in the first process, the ferromagnetic grains, the binder, the binder solution Y1 containing a binder and an organic solvent, and other desired materials such as an organic solvent for the formation of a magnetic layer are kneaded under high shearing force by use of the two-shaft continuous kneading and mixing machine. In this manner, the kneaded mixture K1 having a solid content within the range of 65 wt % to 95 wt %, preferably within the range of 70 wt % to 92 wt % is prepared. In the case where the mixture containing the ferromagnetic grains, the binder and other constituents is such that the solid content of the kneaded mixture K1 is lower than 65 wt %, as the viscosity of the mixture is too low, substantially high shearing force cannot be obtained during the kneading, and substantially high dispersion effects cannot be obtained. On the other hand, in the case where the mixture is such that the solid content of the kneaded mixture K1 is higher than 95 wt %, the viscosity of the mixture is too high, and a uniform kneaded mixture cannot be obtained.

In the second process, at least the binder solution Y2 which may be identical with or different from the binder solution Y1 is added to the kneaded mixture K1, and the thus obtained mixture is kneaded and the kneaded mixture K1 is diluted under high shearing force by use of the two-shaft continuous kneading and mixing machine. In this manner, the primary diluted mixture K2 having a solid content within the range of 50 wt % to 70 wt % is prepared. In the case where the concentration of the kneaded mixture K1 which is to be kneaded and diluted is too high and the primary diluted mixture K2 cannot be prepared by the addition of only the binder solution Y2, an organic solvent may be added to the kneaded mixture K1. The solid content of the primary diluted mixture K2 should preferably be within the range of 50 wt % to 65 wt %. In the case where the kneaded mixture K1 is such that the solid content of the primary diluted mixture K2 is lower than 50 wt %, the viscosity of the kneaded mixture K1 decreases too sharply during the kneading and the dilution, and therefore the kneaded mixture K1 cannot be diluted uniformly. On the other hand, in the case where the kneaded mixture K1 is such that the solid content of the primary diluted mixture K2 is higher than 70 wt %, uniform dilution cannot be achieved in the next process, and the dispersion efficiency deteriorates markedly.

In the second process, the two-shaft continuous kneading and mixing machine is used as in the first process. Specifically, the viscosity of the kneaded mixture obtained by the kneading with the continuous kneading and mixing machine often increases up to a value within the range of several millions of poises to several tens of millions of poises. In order to carry out the dilution and the dispersion of such a high-viscosity kneaded mixture, the two-shaft continuous kneading and mixing machine is utilized. In this manner, the dilution and the dispersion of the kneaded mixture can be carried out efficiently and reliably.

Kneading operations for the mixture of the materials for the formation of the magnetic coating composition using the two-shaft continuous kneading and mixing machine will hereinbelow be described with reference to FIG. 1.

FIG. 1 shows the configuration of the two-shaft continuous kneading and mixing machine suitable for the present invention. The two-shaft continuous kneading and mixing machine comprises a barrel 13, stirring shafts 12, 12 supported in parallel for rotation in the barrel 13, paddles 15, 15, . . . and a screw 16 secured to one of the stirring shafts 12, 12, and paddles 15, 15, . . . and a screw 16 secured to the other of the stirring shafts 12, 12. The stirring shafts 12, 12 are rotated in the same directions at equal speeds. The paddles 15, 15, . . . and the screws 16, 16 can be combined with each other as desired in the barrel 13. Each of the paddles 15, 15, . . . should preferably be shaped in a pseudo-triangular form. The screws 16, 16 mainly feed the mixture, and the kneading is effected by the pairs of the paddles 15, 15, . . . or the screws 16, 16.

In FIG. 1, reference numeral 11 denotes an inlet for the ferromagnetic grains, the binder, the binder solution Y1 containing a binder and an organic solvent, and other desired materials such as an organic solvent for the formation of a magnetic layer in the first process, or for the kneaded mixture K1 in the second process. In general, the binder, the ferromagnetic grains, the solvent and other constituents are independently introduced into the inlet 11 at adjusted feed rates. Therefore, the viscosity of the mixture can be adjusted by the adjustment of the amount of the solvent or the like.

The constituents thus introduced into the inlet 11 are fed by the screws 16, 16 provided exactly below the inlet 11. The kneading and the feeding are effected by the pairs of the paddles 15, 15, . . . or the screws 16, 16 provided in the barrel 13, and the kneaded mixture for the preparation of the magnetic coating composition is obtained from an outlet 14.

By way of example, a KRC kneader supplied by Kurimoto, Ltd. may be used as the two-shaft continuous kneading and mixing machine. As the KRC kneader, A S-type KRC kneader, a T-type KRC kneader (high-torque type), and a KRC E kneader are available, among which the T-type KRC kneader is preferably used because of high shearing force. The T-type KRC kneader includes various type numbers different in the paddle diameter and power, for example, T2, T4, T5, T6, T8, T10, T12, T15 and T18.

In the third process, the primary diluted mixture K2 is diluted and dispersed by the addition of at least an organic solvent thereto, thereby to obtain the secondary diluted mixture K3 having a solid content within the range of 25 wt % to 50 wt %. In this process, a high-speed grinding apparatus, preferably a flow jet mixer or a high-speed stone mill, is used as the diluting and dispersing machine.

In the case where such a high-viscosity diluted mixture that the solid content of the secondary diluted mixture K3 is higher than 50 wt % is dispersed by use of the high-speed grinding apparatus, the dispersing efficiency is low, and it is difficult to obtain a uniform dispersion mixture. On the other hand in the case where such a diluted mixture that the solid content of the secondary diluted mixture K3 is lower than 25 wt % is dispersed by use of the high-speed grinding apparatus, the viscosity of the diluted mixture is too low, and substantial dispersion cannot be achieved.

Figure 2:
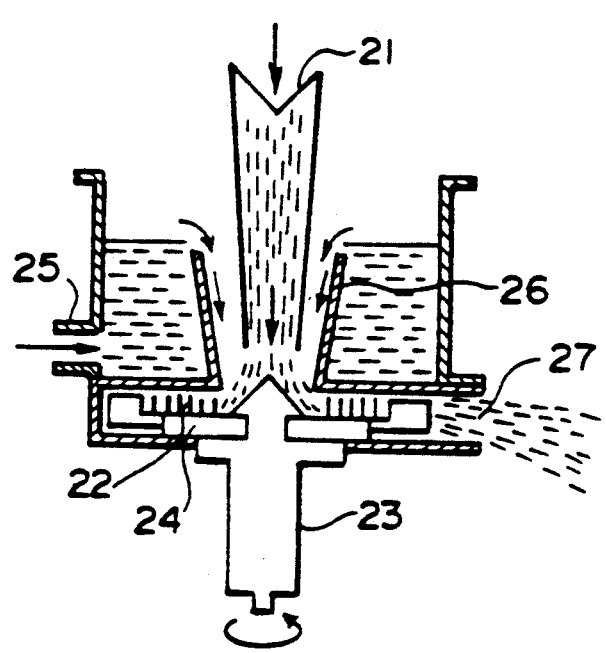
FIG. 2 is a sectional view showing the flow jet mixer for the dilution and dispersion of a kneaded mixture or a diluted mixture for the preparation of the magnetic coating composition.

FIG. 2 shows the configuration of the flow jet mixer. With reference to FIG. 2, the flow jet mixer comprises a raw material inlet 21 provided at an upper part, a rotatable disk 22 provided at the center of a lower part, a rotation shaft 23 for transmitting rotation to the rotatable disk 22, a solvent inlet 25 provided at a side face of the flow jet mixer, a kneading compartment 24 surrounding the rotatable disk 22 for kneading the solvent and the raw materials, an overflow cone provided above the kneading compartment 24 for introducing the solvent into the kneading compartment 24, and an outlet 27 for discharging the dispersion mixture.

With the flow jet mixer, the rotatable disk 22 is rotated, the primary diluted mixture K2 is fed from the raw material inlet 21 at the upper part, and the solvent is fed from the solvent inlet 25 at the side face of the flow jet mixer. The primary diluted mixture K2 and the solvent are quickly mixed together on the rotatable disk 22, and the primary diluted mixture K2 is dispersed in the kneading compartment 24 by shearing force arising at the gap between the side face of the kneading compartment 24 and the edge of the rotatable disk 22. The secondary diluted mixture K3 thus obtained is discharged from the outlet 27 and sent to the next process.

Figure 3:
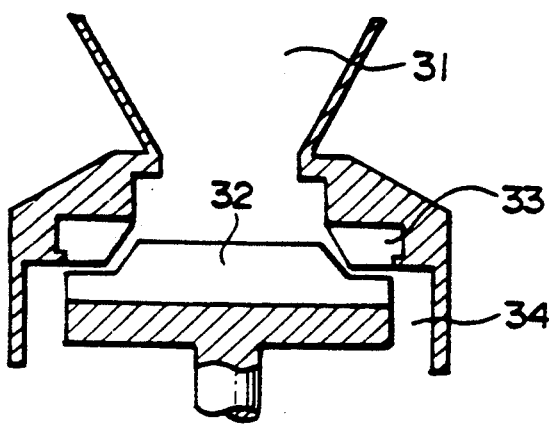
FIG. 3 is a sectional view showing a high-speed stone mill for the dilution and dispersion of a kneaded mixture or a diluted mixture for the preparation of the magnetic coating composition.

FIG. 3 shows the configuration of the high-speed stone mill. With reference to FIG. 3, the high-speed stone mill comprises a raw material inlet 31 provided at an upper part, a rotor 32 provided at the center of a lower part, a stator 33 provided above and around the rotor 32 in close relation thereto, and an outlet 34 for discharging the dispersion mixture. Dispersion is effected at the gap between the parallel faces of the rotor 32 and the stator 33. The primary diluted mixture K2 is fed from the raw material inlet 31 and dispersed by being introduced into the gap between the parallel faces, and the mixture thus dispersed is discharged from the outlet 34.

In the fourth process, fine dispersion processing of the secondary diluted mixture K3 is carried out directly or by the addition of an organic solvent thereto, thereby to obtain the dispersion mixture K4 having a solid content within the range of 25 wt % to 45 wt %. The magnetic coating composition is prepared from the dispersion mixture K4. In general, a wet type medium dispersing machine is used as the dispersion processing apparatus for this process. As the dispersing machine suitable for fine dispersion processing, a sand grinder is preferable. Fine dispersion processing should preferably be carried out by connecting one to eight sand grinders.

The magnetic coating composition exhibiting a high dispersing quality can be prepared efficiently by the aforesaid four processes.

Figure 4:
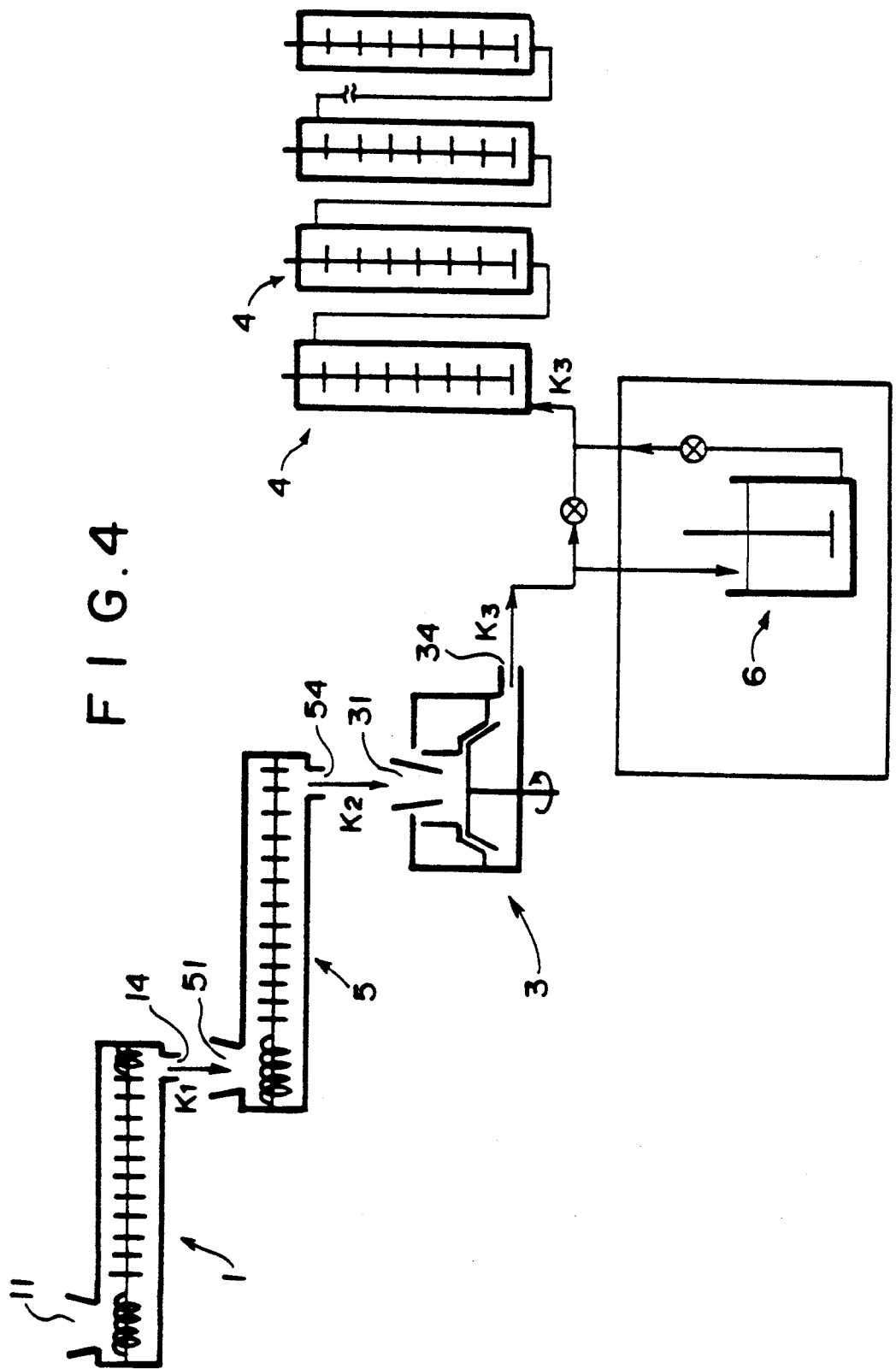
FIG. 4 is a schematic view showing the processes for preparing the magnetic coating composition in accordance with the present invention.

Flow of the four processes will hereinbelow be described with reference to FIG. 4.

First, the ferromagnetic grains, the binder, the binder solution Y1 containing a binder and an organic solvent, and other desired materials such as an organic solvent for the formation of a magnetic layer are fed from the inlet 11 of a two-shaft continuous kneading and mixing machine 1. After the kneading, the kneaded mixture K1 is discharged from the outlet 14. Then, the kneaded mixture K1, the binder solution Y2 and the organic solvent are fed from an inlet 51 of a two-shaft continuous kneading and mixing machine 5, and kneaded to form the primary diluted mixture K2. The primary diluted mixture K2 is discharged from an outlet 54. The primary diluted mixture K2 and the organic solvent are then fed from the raw material inlet 31 of a high-speed stone mill 3, and the primary diluted mixture K2 is dispersed in the organic solvent to form the secondary diluted mixture K3. The secondary diluted mixture K3 is discharged from the outlet 34 of the high-speed stone mill 3, and subjected to fine dispersion in sand grinders 4, 4, . . . , thereby to obtain the dispersion mixture K4.

In the manner as mentioned above, the magnetic coating composition can be prepared continuously by the combination of the kneading machines and the dispersing machines with one another. At the time of shifting from the third process to the fourth process using the sand grinders 4, 4, . . . , the secondary diluted mixture K3 may be stored in a stock tank 6.

After the aforesaid four processes are finished, the magnetic coating composition is prepared from the dispersion mixture K4 by optionally adding a curing agent, a lubricant and a dispersant.

In the method of preparing a magnetic coating composition in accordance with the present invention, the magnetic layer forming materials such as the binder and the ferromagnetic grains, and the solvent as mentioned below may be used.

A known thermoplastic resin, a known thermosetting resin, a known reactive resin, or a combination of two or more of these resins may be used as the binder. Specifically, the binder may be a vinyl chloride copolymer, for example, a vinyl chloride—vinyl acetate copolymer, a vinyl chloride—vinyl acetate—vinyl alcohol copolymer, a vinyl chloride—vinyl acetate—acrylic acid copolymer, a vinyl chloride—vinylidene chloride copolymer, a vinyl chloride—acrylonitrile copolymer, an ethylene—vinyl acetate copolymer, or a vinyl chloride copolymer incorporated with a polar group such as a hydroxyl group, a —COOH group, an amino group, a phosphate group, a —SO$_3$Na group or a —SO$_2$Na group, and an epoxy group; a cellulose derivative such as a nitrocellulose resin; an acrylic resin; a polyvinyl acetal resin; a polyvinyl butyral resin; an epoxy resin; a phenoxy resin; a polyurethane resin, for example, a polyester polyurethane resin, a polyurethane resin incorporated with a polar group such as a hydroxyl group, a —COOH group, an amino group, a phosphate group, a —SO$_3$Na group or a —SO$_2$Na group, or a polycarbonate polyurethane resin.

In the case where a curing agent is used, a polyisocyanate compound is generally used as the curing agent. The polyisocyanate compound is selected from those ordinarily used as a curing agent constituent for polyurethane resins or the like.

Also, in the case where curing processing is carried out by irradiation of an electron beam, a compound having a reactive double bond, for example, urethane acrylate can be used.

The amount of the binder used should preferably within the range of 5 to 35 parts by weight per 100 parts by weight of the ferromagnetic grains.

Ferromagnetic grains ordinarily used for the magnetic recording medium can be used as the ferromagnetic grains for the method of preparing a magnetic coating composition in accordance with the present invention.

By way of example, metal oxide ferromagnetic grains such as $\gamma$-Fe$_2$O$_3$, metal oxide ferromagnetic grains containing a different constituent such as cobalt-containing $\gamma$-Fe$_2$O$_3$, or ferromagnetic metal grains containing iron, cobalt or nickel may be used as the ferromagnetic grains.

The method of preparing a magnetic coating composition in accordance with the present invention should preferably be utilized for the preparation of a magnetic coating composition using ferromagnetic grains having a specific surface area (in accordance with the BET method) of 25m$^2$/g or more.

An abrasive material such as $\alpha$-Al$_2$O$_3$, chromium oxide or silicon carbide (hard inorganic grains), preferably such an abrasive material having a Mohs hardness of 6 or more, is used as well as the aforesaid binder and the ferromagnetic grains. It is also possible to use a solid constituent, for example, a granular antistatic agent such as carbon black (which should preferably has a mean grain diameter within the range of 5 m$\mu$ to 120 m$\mu$). Addition of carbon black should preferably be carried out in one of the first to third processes. Also, the addition of the abrasive material should preferably be carried out in the second process or the third process.

The amount of the abrasive material added is generally not larger than 10 parts by weight per 100 parts by weight of the ferromagnetic grains. In general, the mean grain diameter of the abrasive material should be within the range of 0.1 $\mu$m to 1 $\mu$m.

Agents which are ordinarily used for the preparation of magnetic coating compositions such as a lubricant, an antistatic agent, a filler and a dispersant may be used as well as the aforesaid solid constituents.

By way of example, the dispersant and the lubricant may be a cationic surface active agent, an anionic surface active agent, a fatty acid, a fatty acid salt, a fatty acid ester, silicone oil or a modified silicone.

The addition of the dispersant and the lubricant should preferably be carried out in the second process or after, or in the final step of the preparation of the magnetic coating composition.

The solvent used present invention may be selected from the solvents which are ordinarily used for the preparation of magnetic coating compositions.

By way of example, the solvent may be a ketone such as methyl ethyl ketone, cyclohexanone, diethyl ketone, methyl isobutyl ketone or acetone; an ether such as diethyl ether, methyl ethyl ether or dioxane; an ester such as ethyl acetate or butyl acetate; an aromatic solvent such as toluene or xylene; or an alcohol such as methanol, ethanol, propanol or butanol. These solvents may be used alone or in combination.

The magnetic coating composition prepared in the manner as mentioned above is applied onto a substrate, and subjected to processing ordinarily carried out for the magnetic recording medium such as magnetic-field orientation processing, drying processing and surface smoothing processing, thereby to form a magnetic layer.

The present invention will further be illustrated by the following nonlimitative example. In the example, the term "parts" mean parts by weight unless otherwise specified.

EXAMPLE 1

| Binder solution Y1 | |
|---|---|
| Hydroxyl group-containing vinyl chloride - vinyl acetate copolymer (Denka Vinyl 1000G, Denki Kagaku Kogyo K.K.) | 20 parts |
| Methyl ethyl ketone | 40 parts |
| Butyl acetate | 40 parts |

A binder solution Y1 (resin concentration: 20 wt %) having the composition shown above was prepared.

| Binder solution Y2 | |
|---|---|
| Polyurethane resin (Crisvon 7209, concentration 45%, Dainippon Ink and Chemicals, Inc.) | 30 parts |
| Methyl ethyl ketone | 30 parts |
| Butyl acetate | 30 parts |

A binder solution Y2 (resin concentration: 15 wt %) having the composition shown above was prepared.

A magnetic coating composition was prepared by the four processes shown below.

First Process

| Composition of kneaded mixture K1 | |
|---|---|
| Co-$\gamma$-FeO$_x$ (x = 1.45, coercive force: 700 Oe, mean length of longer axis: 0.3 $\mu$m, specific surface area: 35 m$^2$/g) | 100 parts |
| Binder solution Y1 | 32.5 parts |
| Hydroxyl group-containing vinyl chloride - vinyl acetate copolymer (Denka Vinyl 1000G, Denki Kagaku Kogyo K.K.) | 9.5 parts |
| Carbon black | 20 m$\mu$ |

The composition shown above was continuously added from an inlet of a two-shaft continuous kneading and mixing machine (KRC Kneader T-4, Kurimoto, Ltd.), and kneaded, and a kneaded mixture K1 thus obtained was discharged.

Second process

Thereafter, 143 parts of the kneaded mixture K1 thus obtained and the constituents listed below were continuously added to a two-shaft continuous kneading and mixing machine of the same type as the aforesaid two-shaft continuous kneading and mixing machine.

| Binder solution Y2 | 26.7 parts |
|---|---|
| Methyl ethyl ketone | 15 parts |
| Butyl acetate | 15.3 parts |

The constituents thus added were kneaded, and the kneaded mixture K1 was thus diluted in the two-shaft continuous kneading and mixing machine. A primary diluted mixture K2 thus obtained was discharged from the two-shaft continuous kneading and mixing machine.

Third process

Then, 200 parts of the primary diluted mixture K2 thus obtained and the constituents listed below were continuously added to a high-speed stone mill.

| Myristic acid | 2.0 parts |
|---|---|
| Oleic acid | 0.5 part |
| Dimethyl polysiloxane | 0.2 part |
| $\alpha$-Al$_2$O$_3$ | 0.3 $\mu$m |
| Methyl ethyl ketone | 63 parts |
| Butyl acetate | 63.3 parts |

The constituents thus added were subjected to dilution and dispersion processing in the high-speed stone mill, and a secondary diluted mixture K3 thus obtained was discharged from the high-speed stone mill.

Fourth process

The secondary diluted mixture K3 thus obtained was then introduced into six sand grinders connected to one another, and was subjected to fine dispersion processing to prepare a magnetic coating composition (i.e. a dispersion mixture K4).

In order to evaluate the degrees of dispersion in the third and fourth processes, each of the secondary diluted mixture K3 and the dispersion mixture K4 obtained from each of the sand grinders was applied onto a nonmagnetic substrate, and subjected to orientation processing and drying to form a magnetic layer. In this manner, magnetic tape webs were obtained.

Figure 5:
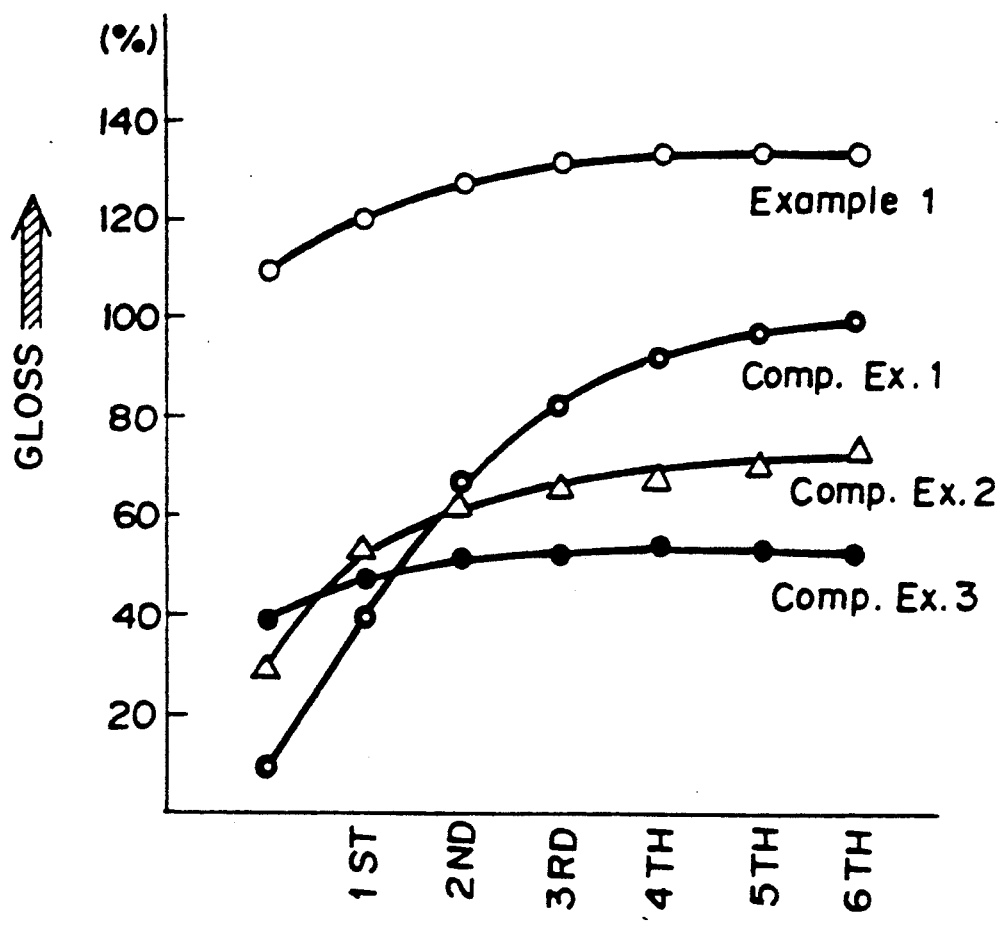
FIG. 5 is a graph showing the relationship between the dispersing machine from which a dispersion mixture is discharged (horizontal axis) and the surface gloss of a magnetic layer formed by use of the dispersion mixture (vertical axis)
Figure 5:
Figure 6:
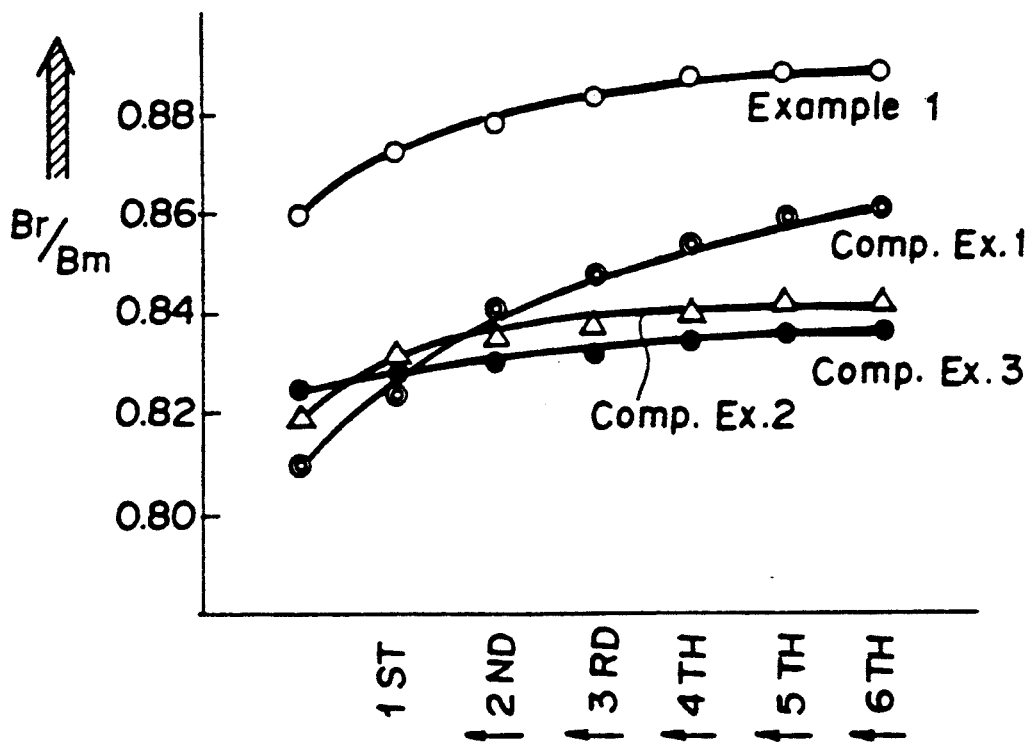
FIG. 6 is a graph showing the relationship between the dispersing machine from which a dispersion mixture is discharged (horizontal axis) and the squareness ratio (Br/Bm) of a magnetic layer formed by use of the dispersion mixture (vertical axis).
Figure 6:

FIG. 5 shows the surface gloss of each of the obtained tapes, and FIG. 6 shows the squareness ratio (Br/Bm) representing the degree of orientation of the magnetic grains in each of the obtained tapes.

COMPARATIVE EXAMPLE 1

A magnetic coating composition was prepared by the three processes shown below.

First process

The first process was carried out in the same manner as in Example 1, the kneaded mixture K1 was discharged.

Second process

Thereafter, 143 parts of the kneaded mixture K1 thus obtained and the constituents listed below were continuously added to a flow jet mixer.

| Binder solution Y2 | 26.7 parts |
|---|---|
| Myristic acid | 2.0 parts |
| Oleic acid | 0.5 part |
| Dimethyl polysiloxane | 0.2 part |
| $\alpha$-Al$_2$O$_3$ | 0.3 $\mu$m |
| Methyl ethyl ketone | 78.0 parts |
| Butyl acetate | 78.6 parts |

The constituents thus added were subjected to dilution and dispersion processing in the flow jet mixer. A primary dispersion mixture thus obtained was discharged from the flow jet mixer.

Third process

Then, in the same manner as in Example 1, the primary diluted mixture thus obtained was then introduced into six sand grinders connected to one another, and was subjected to fine dispersion processing to prepare a magnetic coating composition.

In order to evaluate the degrees of dispersion in the second and third processes, each of the primary dispersion mixture and the dispersion mixture obtained from each of the sand grinders was applied onto a nonmagnetic substrate, and subjected to orientation processing and drying to form a magnetic layer. In this manner, magnetic tape webs were obtained.

The surface gloss of each of the obtained tapes is shown in FIG. 5, and the squareness ratio (Br/Bm) representing the degree of orientation of the magnetic grains in each of the obtained tapes is shown in FIG. 6.

COMPARATIVE EXAMPLE 2

| Binder solution Y3 | |
|---|---|
| Hydroxyl group-containing vinyl chloride - vinyl acetate copolymer (Denka Vinyl 1000G, Denki Kagaku Kogyo K.K.) | 20 parts |
| Myristic acid | 6.5 parts |
| Methyl ethyl ketone | 50 parts |
| Butyl acetate | 50 parts |

A binder solution Y3 containing the dispersant and having the composition shown above was prepared.

A magnetic coating composition was prepared by the three processes shown below.

First Process

| Composition of kneaded mixture K'1 | |
|---|---|
| Co-$\gamma$-FeO$_x$ (x = 1.45, coercive force: 700 Oe, mean length of longer axis: 0.3 $\mu$m, specific surface area: 35 m$^2$/g) | 100 parts |
| Binder solution Y3 | 34.5 parts |
| Hydroxyl group-containing vinyl chloride - vinyl acetate copolymer (Denka Vinyl 1000G, Denki Kagaku Kogyo K.K.) | 9.5 parts |
| Carbon black | 20 m$\mu$ |

The composition shown above was continuously added from an inlet of a two-shaft continuous kneading and mixing machine (KRC Kneader T-4, Kurimoto, Ltd.), and kneaded, and a kneaded mixture K'1 thus obtained was discharged.

Second process

Thereafter, 145 parts of the kneaded mixture K'1 thus obtained and the constituents listed below were continuously added to a flow jet mixer.

| Binder solution Y2 | 26.7 parts |
|---|---|
| Oleic acid | 0.5 part |
| Dimethyl polysiloxane | 0.2 part |
| $\alpha$-Al$_2$O$_3$ | 0.3 $\mu$m |
| Methyl ethyl ketone | 78.0 parts |
| Butyl acetate | 78.6 parts |

The constituents thus added were subjected to dilution and dispersion processing in the flow jet mixer. A primary dispersion mixture thus obtained was discharged from the flow jet mixer.

Third process

Then, in the same manner as in Example 1, the primary diluted mixture thus obtained was then introduced into six sand grinders connected to one another, and was subjected to fine dispersion processing to prepare a magnetic coating composition.

In order to evaluate the degrees of dispersion in the second and third processes, each of the primary dispersion mixture and the dispersion mixture obtained from each of the sand grinders was applied onto a nonmagnetic substrate, and subjected to orientation processing and drying to form a magnetic layer. In this manner, magnetic tape webs were obtained.

The surface gloss of each of the obtained tapes is shown in FIG. 5, and the squareness ratio (Br/Bm) representing the degree of orientation of the magnetic grains in each of the obtained tapes is shown in FIG. 6.

COMPARATIVE EXAMPLE 3

| Binder solution Y4 | |
|---|---|
| Vinyl chloride - vinyl acetate copolymer (VAGH, Union Carbide Co.) | 4 parts |
| Polyurethane resin (Esten 5701H, Goodrich Co.) | 4 parts |
| Lecithin | 1 part |
| Methyl ethyl ketone | 50 parts |
| Toluene | 50 parts |

A binder solution Y4 containing the dispersant and having the composition shown above was prepared.

A magnetic coating composition was prepared by the three processes shown below.

First Process

| Composition of kneaded mixture K"1 | |
|---|---|
| Co-$\gamma$-FeO$_x$ (x = 1.45, coercive force: 700 Oe, mean length of longer axis: 0.3 $\mu$m, specific surface area: 35 m$^2$/g) | 100 parts |
| Binder solution Y4 | 25 parts |

The composition shown above was continuously added from an inlet of a two-shaft continuous kneading and mixing machine (KRC Kneader T-4, Kurimoto, Ltd.), and kneaded, and a kneaded mixture K"1 thus obtained was discharged.

Second process

Thereafter, 125 parts of the kneaded mixture K"1 thus obtained and 125 parts of the binder solution Y4 were continuously added to a flow jet mixer and subjected to dilution and dispersion processing in the flow jet mixer. A primary dispersion mixture thus obtained was discharged from the flow jet mixer.

Third process

Then, in the same manner as in Example 1, the primary diluted mixture thus obtained was then introduced into six sand grinders connected to one another, and was subjected to fine dispersion processing to prepare a magnetic coating composition.

In order to evaluate the degrees of dispersion in the second and third processes, each of the primary dispersion mixture and the dispersion mixture obtained from each of the sand grinders was applied onto a nonmagnetic substrate, and subjected to orientation processing and drying to form a magnetic layer. In this manner, magnetic tape webs were obtained.

The surface gloss of each of the obtained tapes is shown in FIG. 5, and the squareness ratio (Br/Bm)

representing the degree of orientation of the magnetic grains in each of the obtained tapes is shown in FIG. 6.

The measurement conditions for the surface gloss and the Br/Bm value of the magnetic tape webs obtained in Example 1 and Comparative Examples 1 to 3 were as described below.

Surface gloss (%)

The surface gloss was measured at an angle of incidence of 5° in accordance with JIS-Z-8741. The values of the surface gloss shown in FIG. 5 are the values with respect to the specular gloss of a surface of a glass having a refractive index of 1.567, which is taken as 100%.

Br/Bm (Squareness ratio)

The Br/Bm value at Hm 5k Oe was measured by use of a vibrating sample magnetic flux meter (Toei Kogyo K.K.).

Bm denotes the maximum magnetic flux density, and Br denotes the residual magnetic flux density.

For the tapes obtained in Example 1 and Comparative Examples 1 to 3, the surface gloss values are shown in FIG. 5, and the squareness ratios (Br/Bm) are shown in FIG. 6.

In FIG. 5, the dispersing machine from which the dispersion mixture is discharged is plotted on the horizontal axis, and the surface gloss of the magnetic layer formed by the dispersion mixture is plotted on the vertical axis. Specifically, on the horizontal axis, the first graduation denotes the dispersion mixture discharged from the high-speed grinding mill. The second and subsequent graduations denote the dispersion mixtures discharged from the first sand grinder, the second sand grinder, the third sand grinder, the fourth sand grinder, the fifth sand grinder and the sixth sand grinder.

In FIG. 6, the dispersing machine from which the dispersion mixture is discharged is plotted on the horizontal axis, and the squareness ratio (Br/Bm) of the magnetic layer formed by the dispersion mixture is plotted on the vertical axis. The electromagnetic conversion characteristics are more excellent as the squareness ratio is larger.

As is clear from FIGS. 5 and 6, the magnetic tapes obtained by the method of preparing a magnetic coating composition in accordance with the present invention exhibit high surface gloss and a high squareness ratio (Br/Bm), and consequently exhibit excellent electromagnetic conversion characteristics. Even the dispersion mixture obtained from the third process in accordance with the present invention exhibits such excellent characteristics. Also, the characteristics are further improved by fine dispersion processing in the sand grinders in the fourth process in accordance with the present invention.

With Comparative Examples 1 to 3 wherein the mixture obtained by the first process is directly subjected to dilution and dispersion in the high-speed grinding apparatus without carrying out the second process of Example 1, i.e. without carrying out dilution and dispersion processing by use of the two-shaft continuous kneading and mixing machine, the surface gloss and the squareness ratio (Br/Bm) at the initial stage of dispersion are very low. Also, even though the dispersion is repeated by use of the sand grinders, such excellent characteristics as obtained with the magnetic tapes formed by use of the dispersion mixture discharged from the initial third process of Example 1 cannot be obtained (though the characteristics are improved slightly). With Comparative Examples 2 and 3 wherein the kneading is carried out by using the dispersant in the two-shaft continuous kneading and mixing machine, though the characteristics at the initial stage of dispersion are more excellent than with Comparative Example 1, the effects of the subsequent fine dispersion processing are smaller than with Comparative Example 1, and no improvement is achieved over Comparative Example 1.

We claim:

1. A method of preparing a dispersion mixture K4 for use in a magnetic coating, said method comprising the process steps of:
   i) a first process step of kneading ferromagnetic grains, a first binder, and a binder solution Y1 containing a second binder and an organic solvent under shearing force in a two-shaft continuous kneading and mixing machine having a pair of shafts with a paddle member and a barrel for rotatably housing the shafts, thereby to obtain a kneaded mixture K1 having a solid content within the range of 65 wt % to 95 wt %,
   ii) a second process step of adding at least a binder solution Y2, which may be identical or different in composition from said binder solution Y1, to said kneaded mixture K1, and kneading the thus obtained mixture and thus diluting said kneaded mixture K1 under high shearing force in said two-shaft continuous kneading and mixing machine, thereby to obtain a primary diluted mixture K2 having a solid content within the range of 50 wt % to 70 wt %,
   iii) a third process step of diluting and dispersing said primary diluted mixture K2 by adding at least an organic solvent thereto, thereby to obtain a secondary diluted mixture K3 having a solid content within the range of 25 wt % to 50 wt %, and
   iv) a fourth process step of carrying out fine dispersion processing of said secondary diluted mixture K3 directly or by the addition of an organic solvent thereto, thereby to obtain said dispersion mixture K4 having a solid content within the range of 25 wt % to 45 wt %, wherein said method further comprises adding at least one of a dispersant and a lubricant in only one of the third process step and said fourth process step.

2. A method as defined in claim 1 wherein discharging of the mixture from a preceding process step and feeding of said discharged mixture to the next process step among said first process step, said second process step and said third process step are carried out continuously.

3. A method as defined in claim 1 wherein discharging of the mixture from a preceding process step and feeding of said discharged mixture to the next process step among said first process step, said second process step, said third process step and said fourth process step are carried out continuously.

4. A method as defined in claim 1 wherein said two-shaft continuous kneading and mixing machine is provided with a material inlet, a kneading vessel accommodating said pair of shafts each having a screw and paddles for kneading and conveying the materials, and an outlet for discharging the kneaded mixture, and continuously carries out material feeding, kneading and discharging.

5. A method as defined in claim 1 wherein a dispersing machine used for the dilution and dispersion in said third process is a high-speed grinding type dispersing machine provided with a material inlet, a rotatable member for mixing and dispersing the materials, and an outlet for discharging the dispersion mixture, and capable of continuously carrying out material feeding, dispersion and discharging.

6. A method as defined in claim 1 wherein a dispersing machine used for fine dispersion processing in said fourth process is a sand grinding, wet type medium dispersing machine provided with a material inlet, a cylindrical dispersing vessel which accommodates a rotation shaft having rotation disks and which is filled with dispersing medium such as glass beads, and an outlet for discharging the dispersion mixture, said sand grinding, wet type medium dispersing machine being capable of continuously carrying out material feeding, dispersion and discharging.

7. A method as defined in claim 1 wherein each of said second binder contained in said binder solution Y1 and a third binder contained in said binder solution Y2 is at least one kind of a resin selected from the group consisting of a vinyl chloride copolymer, a cellulose resin, an acrylic resin, a polyvinyl acetal resin, a polyvinyl butyral resin, an epoxy resin, a phenoxy resin, a polyurethane resin, and a polyester resin.

8. A method of preparing a dispersion mixture K4 for use in a magnetic coating, said method comprising the process steps of:

i) a first process step of kneading ferromagnetic grains, a first binder, and a binder solution Y1 containing a second binder and an organic solvent under shearing force in a two-shaft continuous kneading and mixing machine having a pair of shafts with a paddle member and a barrel for rotatably housing the shafts, thereby to obtain a kneaded mixture K1 having a solid content within the range of 65 wt % to 95 wt %, ii) a second process step of adding at least a binder solution Y2 containing a third binder, which may be identical or different in composition from said binder solution Y1, to said kneaded mixture K1, and kneading the thus obtained mixture and thus diluting said kneaded mixture K1 under high shearing force in said two-shaft continuous kneading and mixing machine, thereby to obtain a primary diluted mixture K2 having a solid content within the range of 50 wt % to 70 wt %, iii) a third process step of diluting and dispersing said primary diluted mixture K2 by adding at least an organic solvent thereto, thereby to obtain a secondary diluted mixture K3 having a solid content within the range of 25 wt % to 50 wt %, and iv) a fourth process step of carrying out fine dispersion processing of said secondary diluted mixture K3 directly or by the addition of an organic solvent thereto, thereby to obtain said dispersion mixture K4 having a solid content within the range of 25 wt % to 45 wt %, wherein said method further comprises adding at least one of a dispersant and a lubricant in only one of the third process step and said fourth process step, wherein discharging of the mixture from a preceding process step and feeding of said discharged mixture to the next process step among said first process step, said second process step, said third process step and said fourth process step are carried out continuously, said two-shaft continuous kneading and mixing machine being provided with a material inlet, a kneading vessel accommodating said pair of shafts each having a screw and paddles for kneading and conveying the materials, and an outlet for discharging the kneaded mixture, said two-shaft continuous kneading and mixing machine continuously carrying out material feeding, kneading and discharging, wherein each of said second binder contained in said binder solution Y1 and a third binder contained in said binder solution Y2 is at least one kind of a resin selected from the group consisting of a vinyl chloride copolymer, a cellulose resin, an acrylic resin, a polyvinyl acetal resin, a polyvinyl butyryl resin, an epoxy resin, a phenoxy resin, a polyurethane resin, and a polyester resin.

9. A method of preparing a dispersion mixture K4 as claimed in claim 8, wherein the viscosity of the kneaded mixture K1 is adjusted by varying the amount of said organic solvent being kneaded.

10. A method of preparing a dispersion mixture K4 as claimed in claim 9, further comprising processing said secondary diluted mixture K3 through a tank at the time of shifting from the third process step to the fourth process step.

* * * * *